Figure 1:
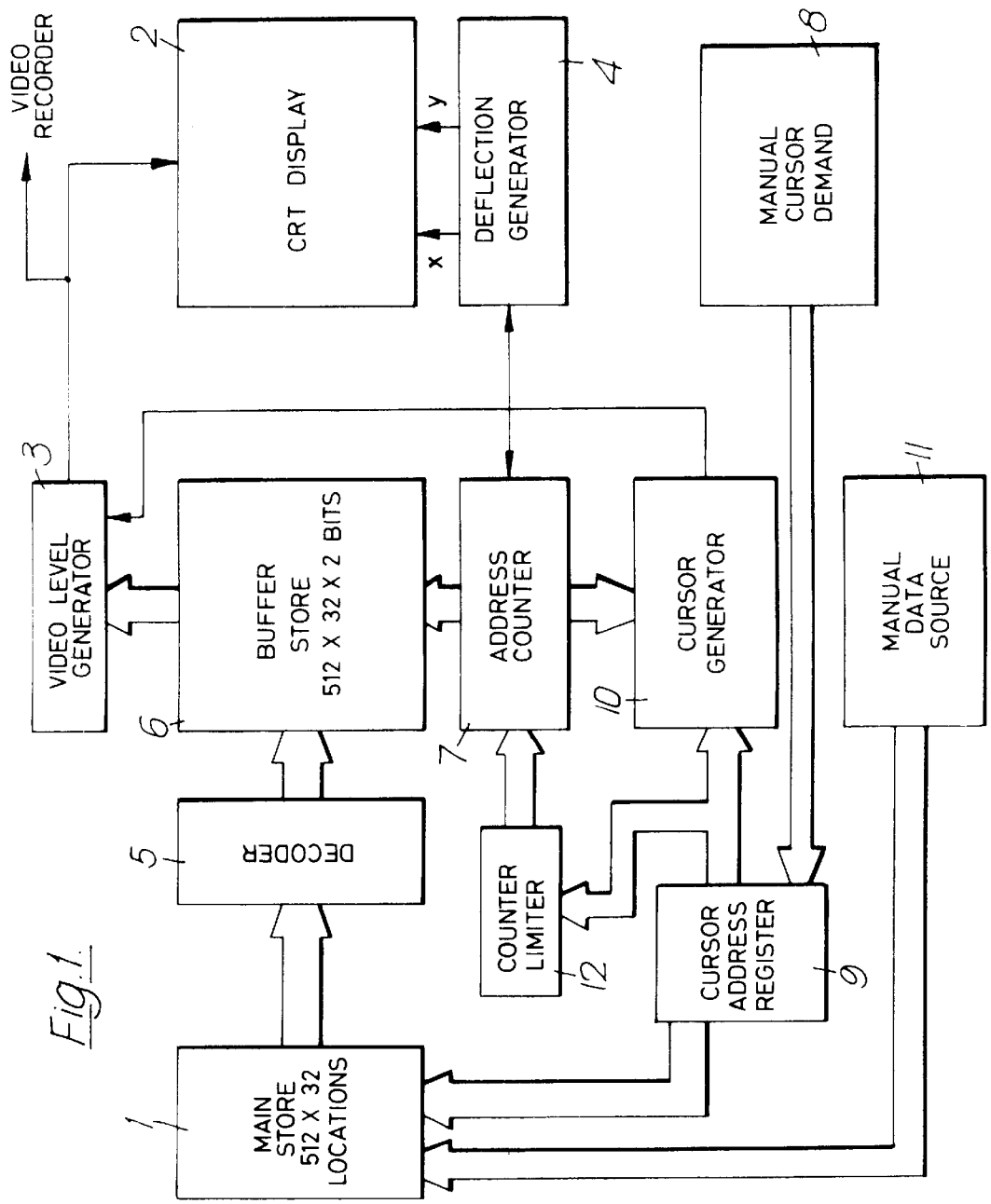

United States Patent [19]

Guppy et al.

[11] Patent Number: 5,844,520

[45] Date of Patent: Dec. 1, 1998

[54] SURVEILLANCE APPARATUS

[75] Inventors: John R. Guppy; Geoffrey J. Allcock, both of Hitchin, England

[73] Assignee: British Aerospace PLC, Weybridge, England

[21] Appl. No.: 548,674

[22] Filed: Oct. 31, 1983

[51] Int. Cl.⁶ ..................................................... G01S 13/00

[52] U.S. Cl. ........................ 342/177; 342/183; 342/179; 250/342

[58] Field of Search ............................... 343/5 CD, 5 VQ, 343/5 SC, 5 W; 340/709, 715, 731; 367/113; 358/187; 342/176, 177, 179, 181, 183; 250/342

[56] References Cited

U.S. PATENT DOCUMENTS

| 4,205,313 | 5/1980 | Pease | 343/5 EM |
|---|---|---|---|
| 4,546,355 | 10/1985 | Boles | 343/7 ED |

FOREIGN PATENT DOCUMENTS

| 1096422 | 12/1967 | United Kingdom . |
|---|---|---|
| 1523721 | 9/1978 | United Kingdom . |

*Primary Examiner*—Theodore M. Blum
*Attorney, Agent, or Firm*—Cushman Darby & Cushman, IP Group of Pillsbury Madison & Sutro, LLP

[57] ABSTRACT

In an infra-red surveillance system, a digital memory (1) has a storage location for each of a number of zones, defined by azimuth and elevation co-ordinates, the zones together covering 360° in azimuth and 20°, for example, in elevation. In each location there is stored a data word built up from the responses on a zone in successive scans. Each word can be read into a decoder (5) which selects an appropriate video display level in the form of a two-bit word which is then stored in a buffer store (6). A buffer store data controls the display on a cathode ray tube (2). A manually controlled cursor circuit (8) generates a cursor address which results in a cursor display at the corresponding position on the cathode ray tube. The display is in the form of four strips, one above the other, each representing a quadrant of azimuth.

11 Claims, 3 Drawing Sheets

SURVEILLANCE APPARATUS

This invention relates to surveillance apparatus comprising visual display means for reproducing an image of a surveyed scene. The surveillance may be of the kind using infra-red detection.

Surveillance apparatus according to the invention comprises a digital memory for storing numbers determined by signals derived from successive scannings of zones having a known spatial relationship in a scene to be surveyed, means for reading the contents of the digital memory, visual display apparatus responsive to the numbers read from the memory for presenting a visual display of data derived from the stored numbers, the relative positions of the items of data on the display being governed by the relative positions of the corresponding zones in the scene to be surveyed, a manually controlled circuit for generating a cursor address, and means responsive to a correspondence in the output of a display scanning control circuit and to the output of the cursor address generating circuit for providing an indication on the display at the point defined by the cursor address.

In the preferred form of apparatus, the cursor address additionally has access to the digital memory and enables a data signal, generated by an operator, to be entered into the corresponding address in the memory. The signal entered by the operator may affect the manner in which the surveillance apparatus treats further responses from the corresponding portion of the scene surveyed; for example, the operator may instruct the apparatus, through the memory, to ignore responses from the portion of the scene corresponding to the indicated address.

In the preferred form of apparatus embodying the invention, the field of view extends through 360° and in the display the four quadrants are shown one above the other.

The display means conveniently uses a conventional cathode ray tube and to avoid reading from the main memory at the frequency required to give a flicker-free display on a cathode ray tube, data may be read from the main memory into a buffer store once per second, for example. The buffer store may additionally serve to convert the binary data values in the main memory into one of a number of different data values which correspond to different forms of display on the cathode ray tube, for example white, grey, black or flashing.

Figure 2:
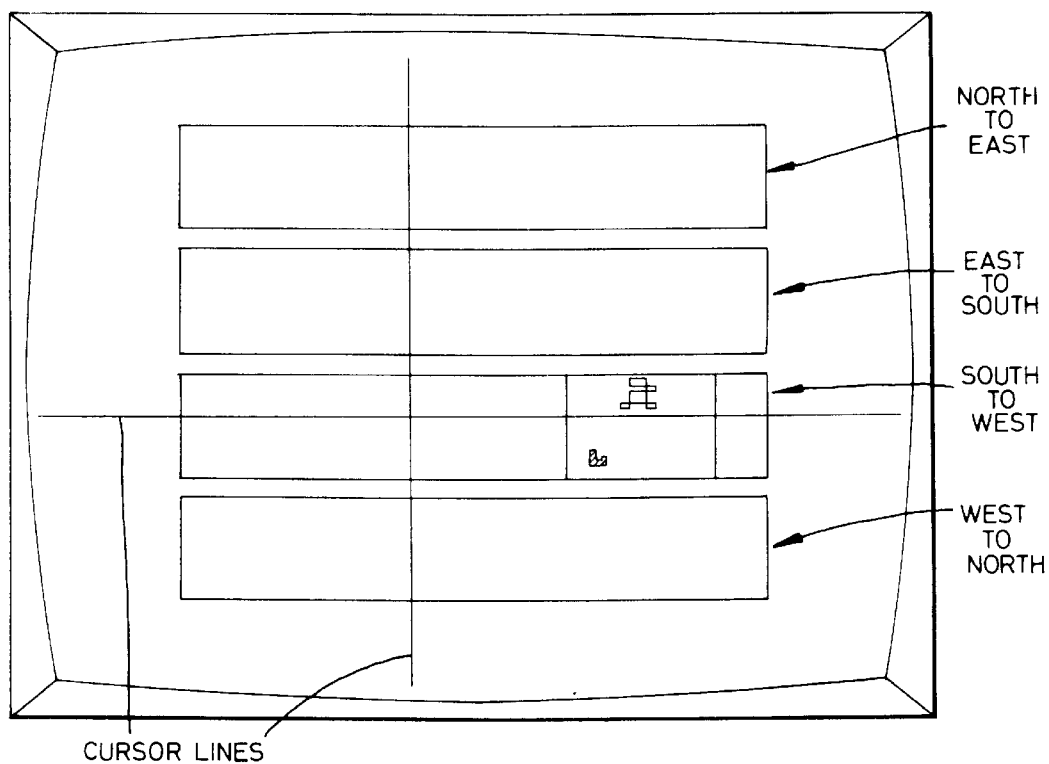
Figure 3:
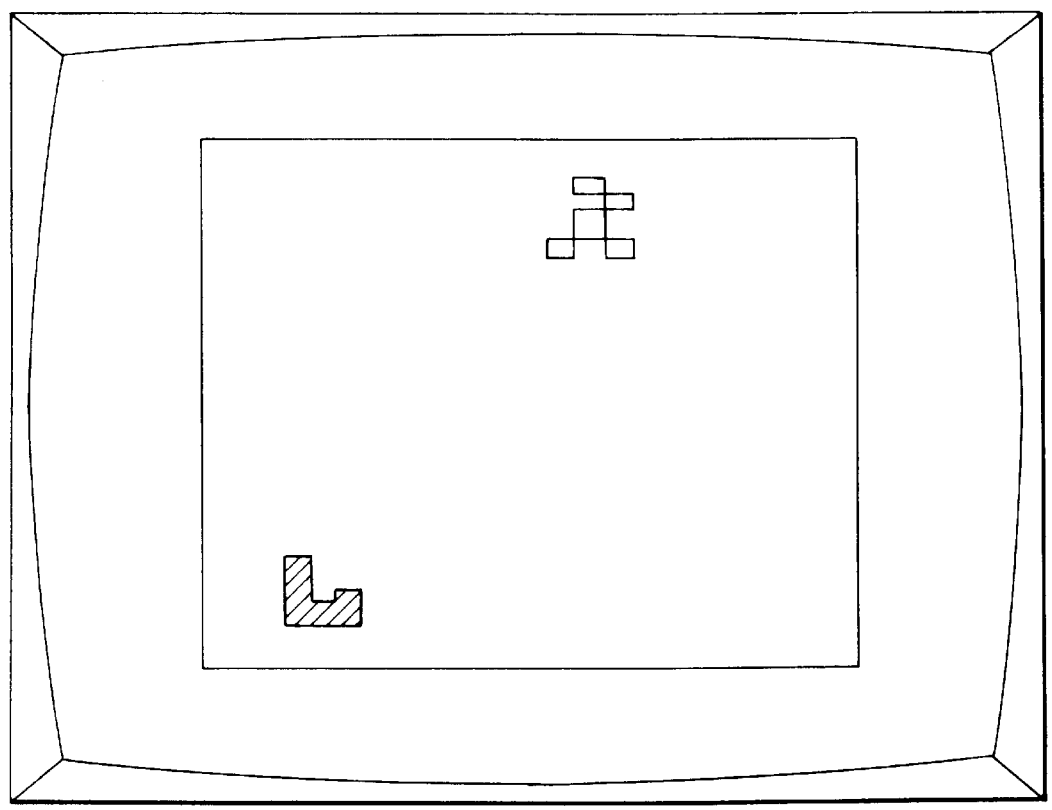

In order that the invention may be better understood, an example of apparatus embodying the invention will now be described with reference to the accompanying drawings, in which FIG. 1 shows a functional block diagram of a video display unit in an infra-red surveillance system, FIG. 2 shows a video display screen depicting the total field of view of a scanning surveillance system, and FIG. 3 shows a video display enlargement of the area bounded by dashed lines in FIG. 2.

The infra-red surveillance system of the present example scans a field of view extending through 360° in azimuth by approximately 20° in elevation. Infra-red radiation sensors convert the radiance of sources observed in the surveyed scene into analogue electrical signals which are then digitised, processed and stored in a digital memory at addresses corresponding to the spatial co-ordinates of the radiation source with respect to the field of view.

Simultaneously with the flow of new data into the memory, data processing programmes are carried out using the data in the memory. In order that a surveillance system operator may monitor and control these processes an operator/machine interface unit is arranged, in conjunction with visual display apparatus, to provide data entry and retrieval and control facilities.

The field of view of the infra-red surveillance system is divided into 16,384 zones, 512 in azimuth by 32 in elevation, each of which is identifiable by an azimuth-elevation co-ordinate and for which there is an exactly corresponding location and address in the digital memory, indicated by reference numeral 1 in FIG. 1. The video display means in the present example, comprises a conventional monitor represented by a cathode ray tube screen 2, a video level generator 3 and a raster scan deflection generator 4. A conventional television format operating at 25 frames per second with 625 lines per frame allows standard television equipment and video recorders to be employed.

Since the field of view of the surveillance apparatus extends through 360° in azimuth but only 20° in elevation it is convenient to present the video picture as four separate quadrants displayed one above the other as shown in FIG. 2. In descending order from the top of the picture the quadrants cover North to East, East to South, South to West, and West to North. Each quadrant is divided into 128 zones in azimuth and 32 in elevation, totalling 4096 zones.

The contents of the main memory store 1 comprise eight-bit words derived from the scene radiance. A stored word does not directly represent scene radiance; in this apparatus, the data represented by the word is built up from the responses in successive scans. Each word is read out of the memory through a decoder 5 which selects an appropriate video display level represented by another digital word which is then stored in a buffer store 6.

The order in which data words are stored in the buffer store may be arranged such that on subsequent sequential scanning of the store addresses their order is compatible with the four quadrant display arrangement.

In this example four display levels are permitted, these are:

i) Black, no light in a video zone,
ii) Grey, an intermediate light level,
iii) White, maximum brightness, and
iv) Flashing, alternating between black and white at a fixed rate, e.g. 2 Hz.

The decoder 5 may comprise, for example, a read-only-memory appropriately pre-programmed so that when addressed with an eight-bit data word from memory 1 a corresponding video level, represented by a two-bit data word, is read out and into the buffer store 6.

The buffer store 6 can be scanned at sufficient speed to give a flicker-free video display, i.e. 25 frames per second, in synchronism with the video raster scan and the two-bit data word output used directly to control the video level generator 3. The synchronous scanning of the buffer store is achieved by means of an address counter 7 adapted to be driven in synchronism with the X-Y axis deflection generator 4 of the video display.

A cross-wire cursor may be displayed on the video screen at any position selected by an operator. A manually controlled cursor circuit 8, operated by a "tracker ball" mechanism, varies the contents of a cursor address register 9. The contents of the cursor register 9 are compared with the contents of the buffer register 7 by cursor generator 10. Whenever the X or Y co-ordinates in the two registers are equal the cursor generator 10, connected directly to the video level generator 3, sends a video bright-up signal to the generator 3. Thus a cursor comprising bright vertical and horizontal lines centred on the manually selected co-ordinate is generated in the video display as shown in FIG. 2.

The cursor address register 9 output may also be fed back to main memory 1 to gain access to the contents of the corresponding data address allowing a data word generated by a manual data source 11 to be read into the memory.

A standard format video recorder may be connected to the output of the video level generator in place of, or in parallel with, the display screen 2.

FIG. 3 shows an enlargement of part of one of the quadrants in FIG. 2 bounded by the dashed lines. The enlargement facility operates by restricting the "area" of the buffer store 6 scanned by the address counter 7. Limits derived from the cursor address may be selected and imposed on the address counter 7 by counter limiter 12. Instead of cycling through all the buffer store addresses, register 7 now only cycles through the restricted number between the limits but still in synchronism with the X-Y axis deflection generator. The appropriate data words, representing video-level brightness, are read out to control video level generator 3 as before but now only for the smaller memory area. The resulting video display is thus an enlargement of the selected area covering the whole screen. Operation of this enlargement facility does not affect transfer of data from the main memory 1 into the buffer store.

We claim:

1. Surveillance apparatus comprising:
    a digital memory for storing numbers determined by signals derived from successive scannings of zones having a known spatial relationship in a scene to be surveyed,
    means for reading the contents of the digital memory,
    visual display apparatus responsive to the numbers read from the memory for presenting a visual display of data derived from the stored numbers, the relative positions of the items of data on the display being governed by the relative positions of the corresponding zones in the scene to be surveyed,
    a manually controlled circuit for generating a cursor address, and
    means responsive to a correspondence in the output of a display scanning control circuit and to the output of the cursor address generating circuit for providing an indication on the display at the point defined by the cursor address,
    said signals being derived from a 360° scan in azimuth and each quadrant of the scanned scene being displayed individually, one above the other on a cathode ray tube.

2. Apparatus in accordance with claim 1, in which the cursor address is additionally applied to the memory together with a manually generated data signal, whereby the data signal is entered into a memory location determined by the operator by means of the cursor address generator.

3. Apparatus in accordance with claim 1, in which the data entered into the digital memory by the operator modifies the effect on the display of a signal representing the detection of radiation from the corresponding zone of the surveyed scene.

4. Apparatus in accordance with claim 3, in which data entered into an address location of the digital memory causes a signal for the corresponding zone of the surveyed scene to be ignored.

5. Apparatus in accordance with claim 1, including a buffer store located between the said digital memory and the display, and in which data read from the digital memory into the buffer store is arranged in the buffer store in an order compatible with the display of the four quadrants one above the other.

6. Apparatus in accordance with claim 1, comprising a buffer store located between the digital memory and the display, and in which data is read from the digital memory into the buffer store at a frequency less than the frequency with which data is supplied from the buffer store to the display.

7. Apparatus in accordance with claim 6, comprising, between the digital memory and the buffer store, a decoder for converting each binary data value from the digital memory into a binary data value having a smaller number of bits for controlling a characteristic or characteristics of the indication provided at the corresponding point in the display.

8. Apparatus in accordance with claim 7, in which the binary data value stored in the buffer store determines whether a continuous or flashing indication is to be provided at the corresponding part of the display.

9. Apparatus in accordance with claim 7, in which the binary data value in the buffer store controls the brightness of the indication at the corresponding point in the display.

10. Apparatus in accordance with claim 5, comprising operator-control means for selecting a portion of the buffer store for display in enlarged form on the display means.

11. Surveillance apparatus in accordance with claim 7, in which infra-red radiation from the scene is detected and corresponding signals are used to modify the contents of the digital memory.

* * * * *